(12) United States Patent
Simpson

(10) Patent No.: US 8,833,818 B2
(45) Date of Patent: Sep. 16, 2014

(54) MULTIFUNCTIONAL RETRIEVAL TOOL ENCOMPASSING AN ARRAY OF USES TO ACCOMMODATE TREE STAND HUNTERS

(71) Applicant: Samuel Lee Simpson, Clendenin, WV (US)

(72) Inventor: Samuel Lee Simpson, Clendenin, WV (US)

( * ) Notice: Subject to any disclaimer, the term of this patent is extended or adjusted under 35 U.S.C. 154(b) by 57 days.

(21) Appl. No.: 13/676,697

(22) Filed: Nov. 14, 2012

(65) Prior Publication Data
US 2014/0132014 A1    May 15, 2014

(51) Int. Cl.
*B25B 7/00* (2006.01)
*B25J 1/02* (2006.01)

(52) U.S. Cl.
CPC ............................. *B25J 1/02* (2013.01)
USPC .............................. 294/2; 294/65.5; 294/82.1

(58) Field of Classification Search
CPC ... B25J 15/0608; B25J 15/0052; B25B 33/00; B25B 11/002; B65G 47/90; H01F 7/206; E21B 31/06; A01M 31/008; A01M 99/00
USPC ........... 294/2, 24, 219, 65.5, 82.1, 66.1, 66.2, 294/82.11
See application file for complete search history.

(56) References Cited

U.S. PATENT DOCUMENTS

| | | | | |
|---|---|---|---|---|
| 3,550,303 A * | 12/1970 | Western | ......................... | 43/17.2 |
| 5,388,877 A * | 2/1995 | Wenk | ............................ | 294/219 |
| 5,462,326 A * | 10/1995 | Doherty | ....................... | 294/19.2 |
| 5,536,053 A * | 7/1996 | Quattlebaum | ................ | 294/219 |
| 6,101,754 A * | 8/2000 | Knapick | ............................ | 43/1 |
| 6,106,042 A * | 8/2000 | McCloy, Jr. | .................. | 294/100 |
| 6,986,537 B2 * | 1/2006 | Robbins et al. | .................... | 294/2 |
| 7,552,957 B2 * | 6/2009 | Bowes | ........................... | 294/1.3 |
| 8,556,313 B2 * | 10/2013 | Miller et al. | ................ | 294/82.1 |

* cited by examiner

*Primary Examiner* — Saul Rodriguez
*Assistant Examiner* — Gabriela Puig

(57) ABSTRACT

A handy compact multifunctional tool used primarily by tree stand hunters, to help make every day hunting from an elevated position more enjoyable as well as to help get you out of the inevitable pinches that hunting throws your way. Having a series of rotatable grapples used for various purposes, including: retrieval of dropped or left behind items, grappling of tree limbs to be removed from the hunter's line of sight, a place to hang weapons or accessories while not in use. A handy dry storage compartment for storage of whatever the user sees fit is conveniently located in side of unit. Magnets are located on the sides and bottom for retrieval of dropped magnetically retrievable items. The grapples are attached to a shank or main body that will later be described which is attached to a rope used for lowering tool and retrieving items etc. When not in use the main body is designed to accommodate the winding and unwinding of attached rope which doubles as a tree stand hunters hoist rope.

6 Claims, 5 Drawing Sheets

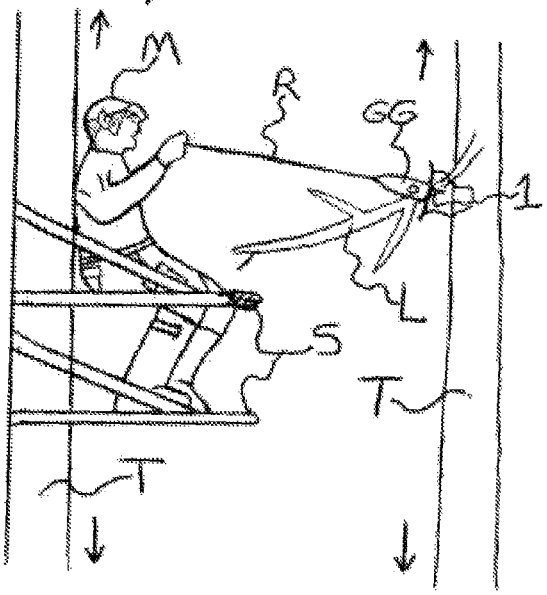
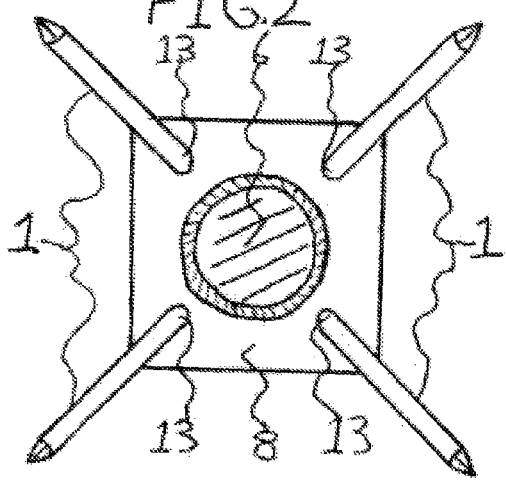
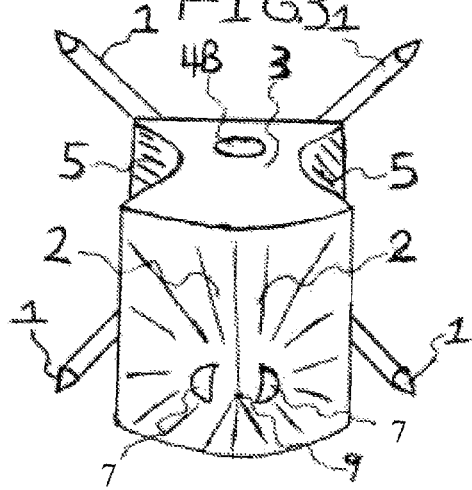

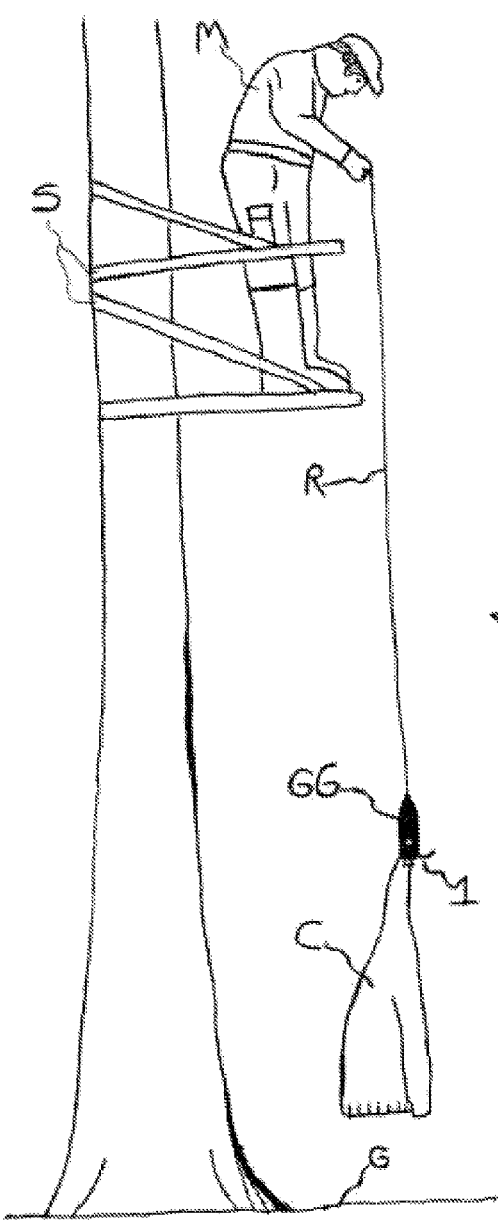
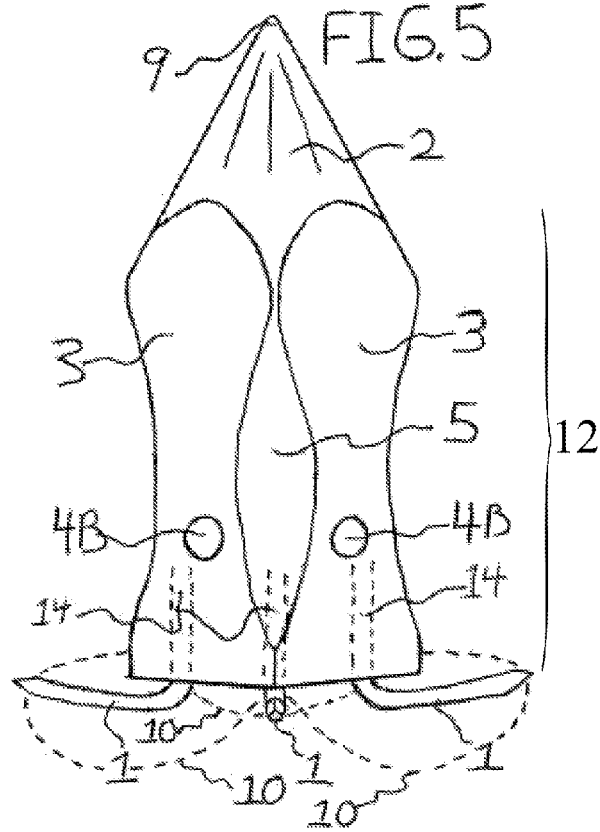
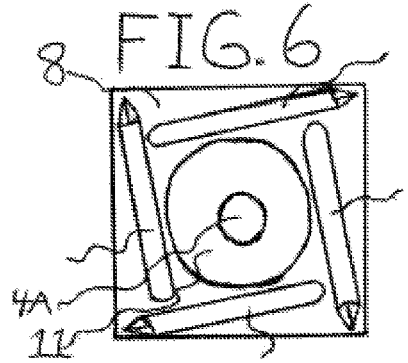

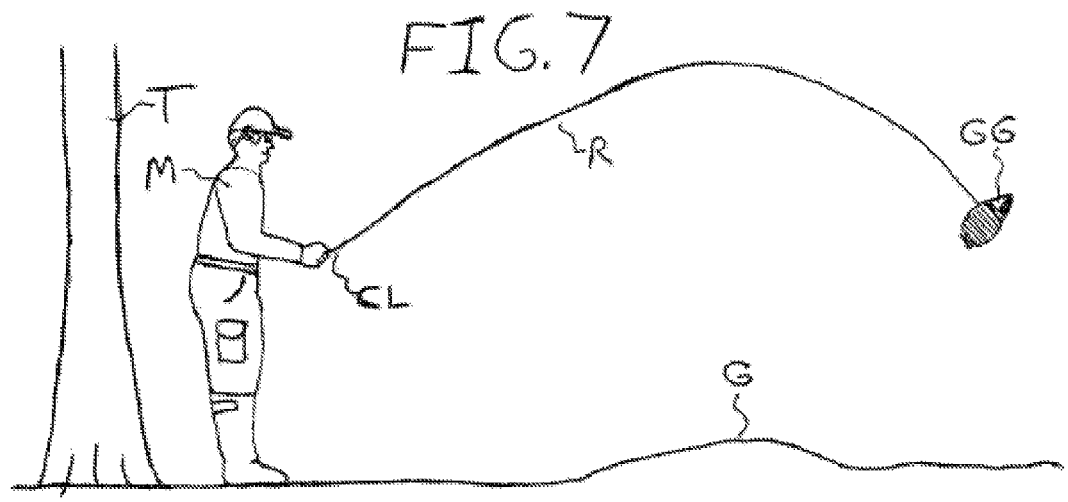
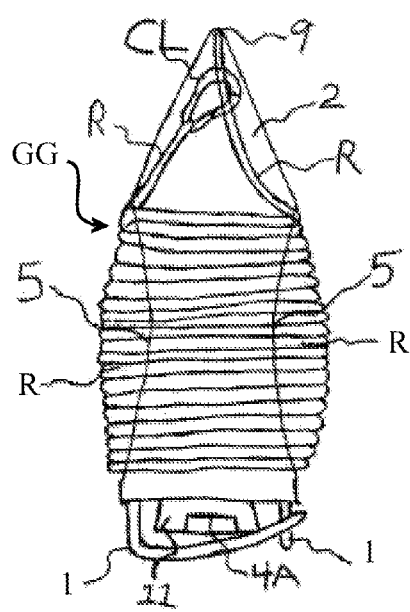
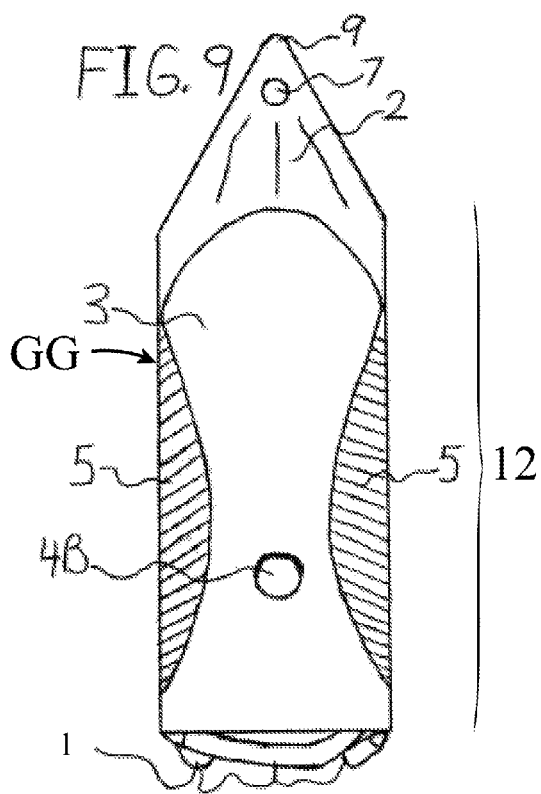

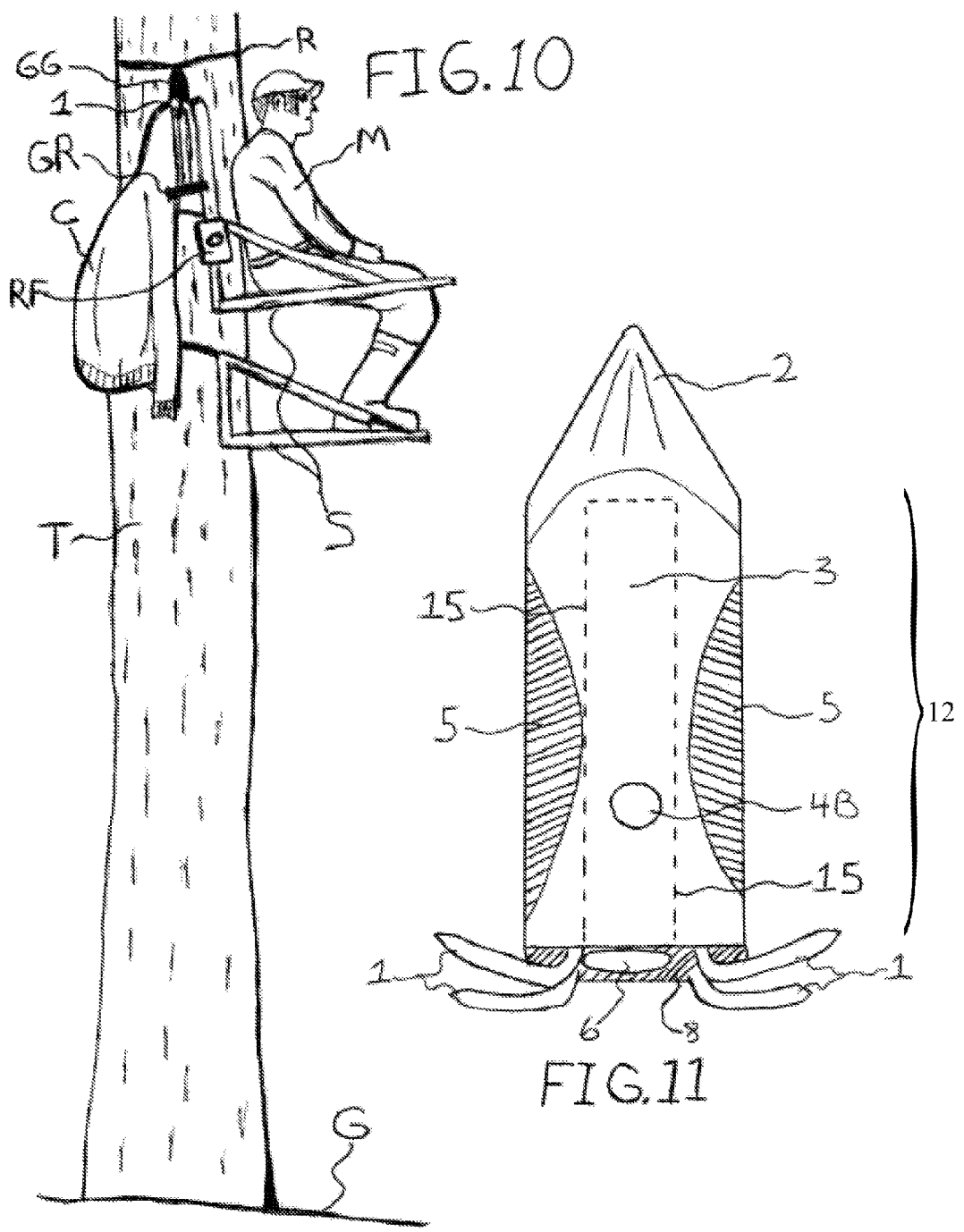

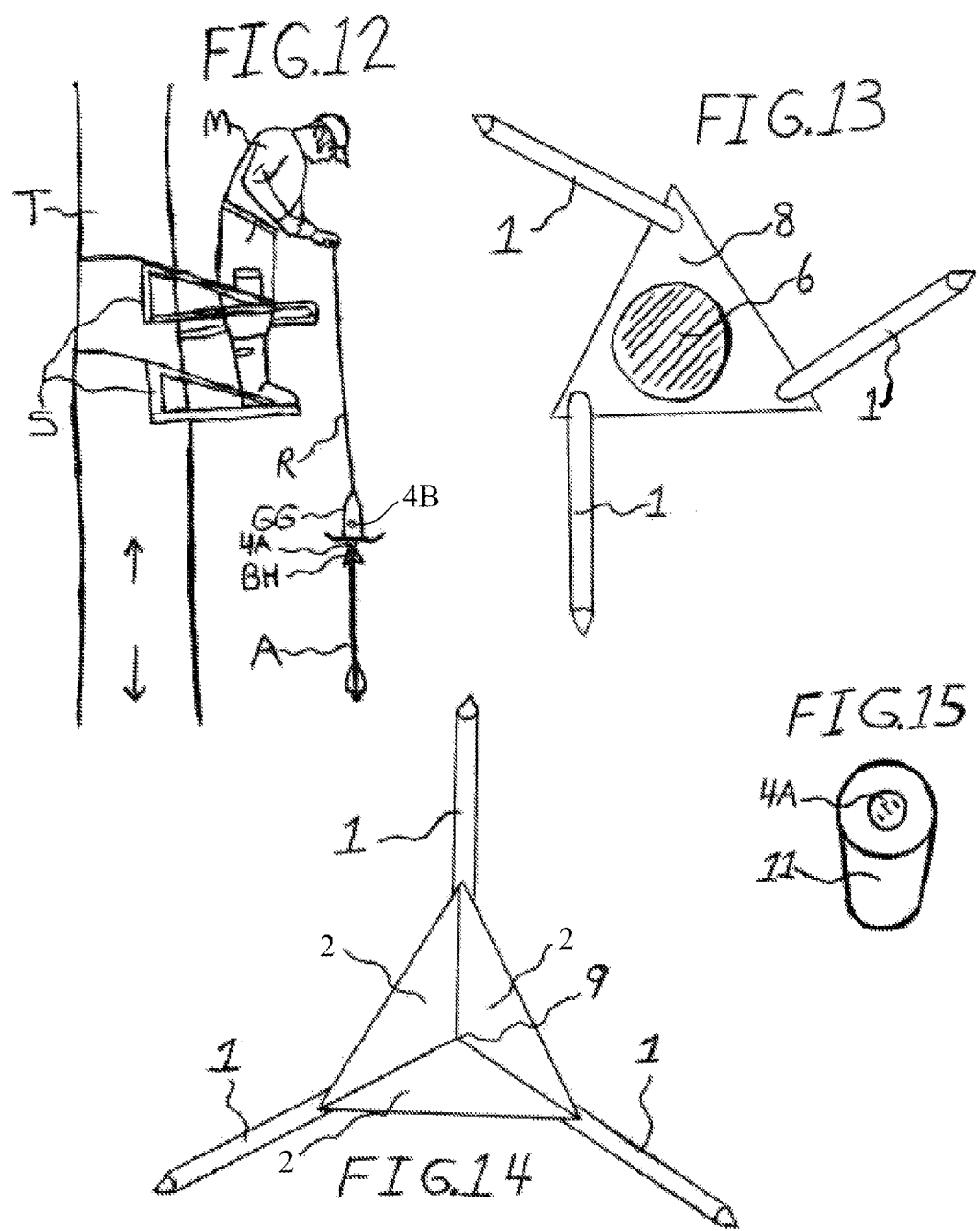

MULTIFUNCTIONAL RETRIEVAL TOOL ENCOMPASSING AN ARRAY OF USES TO ACCOMMODATE TREE STAND HUNTERS

BACKGROUND OF THE INVENTION

I was sitting in my tree stand bow hunting in West Virginia one beautiful autumn morning staring at a tree limb just out of reach. The limb was blocking me from a clear shot where I suspected deer would approach from. I first tried reaching an arrow out to pull the limb in to me. I next tried throwing my hoist rope over the limb to snare it and pull it to me to be broken off. Unable to remove the limb, I thought there has to be a better way. That is when the beginning concepts of this invention were formed and the ideas kept coming that would allow this handy little unit to not only accomplish the above mentioned task, but many others as well, including the retrieval of dropped or left below items when in an elevated perch, a handy dry storage compartment, a very convenient way of storing a hunters hoist rope and deploying it tangle-free every time, a place to hang a gun, bow, or any other items related to hunting just in reach but out of your way.

The sport I love, known as hunting, is full of elements beyond the hunters control—weather, wind direction, and game location just to name a few. Anyone who has spent much time hunting deer knows that the more variables that can be eliminated the greater the chance of success. To help tip the odds a bit, we hunters went to the trees in the form of objects with a platform and seat fastened in an elevated position, generally 15 to 25 feet above the ground. Today many companies manufacture these tree stands in various shapes, sizes, and styles. Most deer hunters own more than one. The use of these tree stands by hunters has opened up a whole world of needs specific to tree-stand hunting.

Hunters routinely spend 3 to 5 hours at a time, and some even 12 or 13 hours, perched on the side of a tree in a tree stand. When someone puts this much effort and time into something, the last thing they want is for the opportunity to get a shot at your quarry to be ruined by something you have control over such as a pesky tree limb just in front of you blocking a clear shot, or a coat left or dropped at the base of the tree easily spotted or smelled by the deer. This is where the present idea comes in. That limb that prevented a clear shot can now be easily removed. That coat that you kept staring at as you shivered from the cold and then the deer spotted and took off before you could get a shot can be retrieved without leaving your perch. Dropped or left behind items can be retrieved with this unit by means of rotatable grappling hooks and a series of magnets embedded into the main body of unit. These grappling hooks can also be used to hang objects commonly used by hunters while on stand. Tree-stand hunters always need a place to hang grunt calls, range finders, coats, etc. This unit allows them to hang items out of the way but in reach. The attached rope doubles as the hunter's hoist rope used for pulling attached items into the elevated position, and it stores the rope neatly wound onto the shaft of unit ready to be sprung into action free from tangles. A handy storage compartment is located conveniently inside the main body of the tool.

Prior art has addressed the need for item retrieval from an elevated position the most similar to mine being U.S. Pat. No. 6,986,537 invented by Chad Robbins and Joey R. Cox. My invention is superior to theirs in several ways, better performing the task of retrieval as well as adding many other hunter friendly uses conveniently packaged in one small unit. The advantages will make themselves evident in later reading.

SUMMARY OF THE INVENTION

My invention is formed from necessity and truly solves many issues that we hunters face, bred by a hunter for hunters. There are many gadgets that function to meet only one need, the issue with this is that many people will not see a great need to purchase an item that solves only one problem. This is the human mentality. Hunters are even more analyzing of the items that they carry with them into the woods. Factors such as weight, function, pack space and how often it will be used are gone over for every item that makes the cut into a hunters pack. This is why the present invention is designed to solve not one but several issues that hunters face on a regular basis and all in a small compact unit that any tree stand hunter could appreciate.

When an item is dropped during a hunt from a tree stand the hunter has a choice to make, either he climbs back down and back up again, risking spooking game and risking injury, not to mention it is just plain tiresome, or the hunter in some cases can simply go without the item. In many cases this will not work, as the item dropped could very well be an item of necessity and not comfort. In the event that the hunter has with him the present invention, yet another choice is given. This is simply lowering unit with attached rope and either hooking or magnetically retrieving dropped item. In the event that a pack or bow etc. is left at the base of tree and the hunter climbs on up realizing what has been left, a lowering of the multifunctional retrieval tool can save the dreaded climb down during the hunt.

A magnet is embedded on each side of the main body of the tool, as well as one magnet affixed to the lowermost portion of multifunctional retrieval tool. The magnets serve the purpose of retrieval of magnetically retrievable objects. The purpose of so many magnets is the one installed on bottom of unit is used to retrieve items dropped directly below the user. Here in West Virginia, items very well may hit the ground and roll down the mountain a ways. This is where the magnets embedded into the sides of main body come into play. The unit can be thrown beyond an item to be retrieved and pulled over it, allowing the magnet to attach itself to an item, and then retrieving it simply by pulling the rope.

For items not retrievable by magnets, a series of grappling hooks are affixed to the lowermost bottom of the main body. The hooks are installed tightly and deeply into the main body. This gives great strength to the hooks. This design also allows hooks to be rotated into whatever configuration the user sees fit and allows them to be nested neatly under the body of tool. This design element is very unique and adds versatility to an already versatile unit. The grappling hooks are designed to retrieve dropped items as well as items that may be in a pond, stream or such body of water allowing the user to stay dry instead of taking the cold plunge to retrieve the item.

The shape of the main body of the tool is such that when the multifunctional retrieval tool is used to grapple tree limbs, the tool is thrown beyond a limb and pulled back slowly over the limb. The tapered top of shaft easily slides over a limb and rolls the shaft to one of the flat sides of the main body. This places the hooks in the optimum position to hook the limb. This tapered top to flat side design also allows unit to be drug over objects being retrieved to be easily hooked by the exposed hooks. The edges of main body are chamfered and concaved slightly. This feature allows the attached hoist rope to be wound around the body of tool. Once in place, the chamfered concave edges prevent the rope from sliding off the top or bottom of the multifunctional retrieval tool when not in use. When the hunter is ready to deploy the tool, he simply unclips the end of the rope from the tool. Throwing the unit will unroll the rope beautifully with an easy, tangle-free deployment. The hunter can then use his tangle free rope to attach to items to be pulled up into tree stand.

A convenient dry storage compartment is located inside the main body of unit. A hole is bored into the bottom and up into the main body. A plug with the embedded bottom magnet is inserted into the hole in the bottom of the main body to seal it off. This handy compartment can be used to keep a variety of items. I personally keep matches and cotton in mine. The cotton is used to determine wind direction break of a little piece and let it fly and see just how the wind will affect your hunt, the matches are always good to have around and could potentially help to save a life.

As mentioned, this item has many uses. One of these is tying the attached rope around a tree, allowing unit to hang on the side of tree. The hooks can then be rotated to a desired position and the hunter has a handy place to hang hunting accessories, such as bows or guns. The flat sides of the main body allows the tool to rest firmly and securely against a tree surface. As you now see this is a truly capable little item that solves not just one but many common issues that we hunters face.

DESCRIPTION OF DRAWINGS

FIG. 1: A man M, in a tree stand S, has a pesky limb L in his line of sight just out of reach. The multifunctional retrieval tool GG has been thrown over limb L and pulled back, allowing the multifunctional retrieval tool GG to slide over limb, allowing for perfect placement of a hook 1 to grapple the limb L. The rope R is then pulled closer to the man M until it can be reached by hand and sawn or broken off and removed from the man's line of sight.

FIG. 2: A view of the lowermost portion of tool is shown, also referred to as the bottom 8. This shows a square model with the hooks 1 in the open position. The number 13 designates the hook's entrance point into the body. The dry storage compartment 6 is shown without a plug installed.

FIG. 3: A view showing the uppermost portion facing you, with the tip 9 angled downward, allowing a view of the side of body 3. The hooks 1 are in the open position and a good view is given of the chamfered concave edges 5 and the drilled hole 7 in top of unit 12.

FIG. 4: The man M, in the tree stand S, has dropped a coat C, to the ground G and is using the multifunctional retrieval tool GG. He has lowered the multifunctional retrieval tool by means of a rope R attached to it. One of the hooks 1 has been placed in such a way on the coat C to snag it. The multifunctional retrieval tool with coat attached is then pulled back up to the man M.

FIG. 5: A view of the square model with a chamfered concave edge facing you. The hooks 1 are in the open position. Three dotted lines labeled 14 extend into main body 12 to show hook shape in their entirety. Dotted lines labeled 10 show the rotational plane of the hooks. Two flat sides 3 are shown providing views of two of the magnets labeled 4B.

FIG. 6: A view of the lowermost underside or bottom is shown with the hooks in the closed position. A view of the dry storage plug 11 with the magnet 4A embedded is also shown.

FIG. 7: The man M is deploying the rope R by simply holding on to the furthest end of rope from the multifunctional retrieval tool GG. The end is labeled CL for clip. This figure illustrates the rope R unwinding from the multifunctional retrieval tool GG after the tool has been thrown by the man M while holding the clip end CL.

FIG. 8: A view of the multifunctional retrieval tool in the storage position with hooks in the closed position. A side view of plug 11 and magnet 4A is shown. The chamfered concave edges 5 are shown to show their purpose of keeping the rope R wound around the body from sliding off when jostled around in a hunter's pack.

FIG. 9: An upright view with the hooks 1 in the closed position is shown. A clear view is given of various elements.

FIG. 10: The man M is waiting patiently in his clutter free tree stand S, thanks to the multifunctional retrieval tool GG. The attached rope R is wrapped around the tree T and tied to itself. The flat sides of main body 12 provide a solid rest against tree T. The hooks 1 are rotated into proper hooking position and various items can then be hung from the hooks 1. This drawing shows a coat C, a grunt call GR, and a rangefinder RF, all hanging out of the hunter's way but still in reach.

FIG. 11: A side view with tip of tool tilted away slightly. This view shows the dry storage compartment 6 as it sits in the body of the tool with dotted lines labeled 15. The hooks 1 are in the open position. Two chamfered concaved edges 5 are shown.

FIG. 12: The man M in tree stand S has dropped an arrow A. He has in his possession the handy multifunctional retrieval tool GG. He has lowered the multifunctional retrieval tool GG by means of the attached hoist rope R. The arrow is not retrievable by means of the hooks 1. Thankfully, an assortment of powerful magnets 4A and 4B adorn the multifunctional retrieval tool GG. The magnet 4A embedded into the plug in the bottom of the main body 12 is placed onto the tip BH of arrow A, thereby magnetically attaching itself to the multifunctional retrieval tool. The unit is then pulled back up the tree to the man M the with arrow A attached.

FIG. 13: This is the bottom view of the triangular shaped model. The hooks 1 are rotated into a position ideal for grappling tree limbs. Notice the empty dry storage compartment 6.

FIG. 14: This is the top of body facing you in the triangular design. Notice the similar appearance to a broad head with the tapered top 2 having three tapered sides 2 down to the flat sides of main body 12. The hooks 1 are in the open position.

FIG. 15: This is the plug 11 that has been referred to. This is a tapered design to fit snugly into dry storage compartment 6. Notice the magnet 4A embedded into plug 11.

DETAILED DESCRIPTION OF THE PREFERRED EMBODIMENTS

A new, improved, multifunction retrieval tool will be described. A hunter's hoist rope inevitably gets tangled and can create frustrations on a cold dark morning prior to climbing into a tree stand. FIG. 8 shows the cure to this all too common problem. A hoist rope R is wound around the main body 12 of a multifunctional retrieval tool GG and held in place by the chamfered concave edges 5. When the hunter is ready to deploy the multifunctional retrieval tool GG for use, a simple unclipping of the clip CL, and throwing the multifunctional retrieval tool GG allows the rope R to unwind beautifully and tangle free, providing the hunter with a frustration-free deployment (refer to FIG. 7).

The multifunctional retrieval tool can be placed into a hunter's pocket so he can climb a tree. Once in the tree at the desired elevated position, the hunter uses the hoist rope to pull his weapon up. Let's assume that the hunter has a tree limb blocking the possibility of a clear deflection-free shot. Referring now to FIG. 1, the handy multifunctional retrieval tool GG can be thrown over and beyond the limb L that is to be removed. The man M then pulls the rope R back towards himself allowing the tapered top 2 to be drug over the limb L. Refer now to FIG. 14. The hooks 1 are extended to the optimum limb-grappling location at a 90 degree angle from flat sides 3. Referring back now to FIG. 1, continued pulling of the rope allows the hooks to engage the limb. The man M continues pulling the rope until the limb can be reached by hand and then broken or sawn off and thus removed from line of sight.

Referring now to FIG. 4, our hunter friend has dropped his coat and has lowered the multifunctional retrieval tool GG. The hooks 1 are in the open position ready for action The coat C has been hooked by the hood, and the man M is thankful he had in his possession the multifunctional retrieval tool GG. He continues pulling the rope R up until the coat C is reached by hand and placed on his shivering body.

FIG. 9 shows a good view of the multifunctional retrieval tool ready for action. It also shows the handy dry storage compartment 6 and the dotted lines 15 show the approximate depth and width of said compartment. I put matches and cotton balls in mine. When hunting, I pull the plug 11 out of the bottom (refer now to FIG. 15) and break off a little piece of cotton, let it go, and it will fly with the wind, showing the hunter just how the wind is going to affect his hunt. Wind direction is very important when hunting to help prevent the animals from smelling you.

Refer now to FIG. 12. The man M has dropped his arrow and has deployed the multifunctional retrieval tool. For this, the tip of the arrow BH has been targeted and the hunter has lowered his multifunctional retrieval tool, allowing the lower magnet 4A to make contact with arrow tip. The magnet has done its job of attracting the metal broad head tip and the hunter is pulling the rope in to himself with arrow in tow. Refer now to FIG. 10. Our hunter friend is thankful to have his hunting chores accomplished and is waiting patiently for his quarry. All of his hunting accessories are neatly out of his way but conveniently within reach thanks to the multifunctional retrieval tool. You see three items hanging from the deployed hooks 1: a coat C, a grunt call GR, and a set of rangefinder binoculars RF. A bow or a gun can also be hung from the multifunctional retrieval tool. You see, this handy product performs many functions.

The multifunctional retrieval tool GG comes in two preferred embodiments which are one in the same as far as function but not appearance. The first will now be described. Looking now at FIG. 5 beginning at the tip 9, the tip is designed in such a way to allow it to easily slide over objects. This is done by a tapered top 2 gradually making its way downward to the main body 12. The flat sides 3 of the main body 12 promote the proper positioning of the multifunctional retrieval tool's hooks 1, particularly when grappling tree limbs, but also when retrieving items horizontally. Furthermore, when the multifunctional retrieval tool is used as seen in FIG. 10, the flat sides 3 allow the main body 12 to have maximum contact with tree, promoting stability. A rare earth magnet 4B is embedded to be flush with each of the flat sides 3 of the main body 12. Working around the main body 12, a concave chamfer 5 of each edge or corner gives a handy place to wind rope as seen in FIG. 8. The main body 12 has holes drilled into the bottom corners going straight up into body of unit. This can be seen in FIG. 5 designated by the number 14. The grappling hooks 1, after leaving body, make a strong bend and face away from body and slightly upward. This angle allows for maximum grappling of dropped items from the elevated position. Also, this allows the tips of hooks to rest snuggly below body and not extending beyond the edge of body as seen in FIG. 6. These hooks can be rotated as seen in FIG. 5, looking now at the dotted lines 10, this shows the path of possible placements of the hooks. Looking now at FIG. 11 a hole 6 bored into bottom of body 8 serves as a handy storage compartment. Reference 15 shows the outline of compartment as it lies in body. FIG. 15 shows a rubber plug that is tapered to allow it to be tightly installed into dry storage compartment 6, sealing it from the elements. A magnet 4A is embedded into the bottom portion of the plug and this magnet does not extend beyond the plug. This magnet is handy for the retrieval of magnetically retrievable items directly below the user. A threaded dry storage compartment with a plug with an "O" ring is also well within the realm of possibilities for this invention. As seen in FIG. 2, a square shape is shown. This is the general shape of the main body 12 of the above described unit. A rope R is attached to the tip of unit by means of a hole 7 drilled through the top. This rope brings the whole idea to life, also doubling as a hoist rope for various hunting equipment. This rope can also be attached to unit via a hole drilled through the tip 9 downward until penetrating into the dry storage area 6. The rope can then be placed through drilled hole in tip and out of the bottom of unit. A knot is then tied in rope end to keep it from being able to be pulled back up through the drilled hole in the tip. This allows for a neat clean appearance and a unique attachment of hoist rope R.

The second preferred design is the same as the above-mentioned square model, except this one has a triangular shaped body. Three total hooks are used with this model instead of four as in the square model. The tapered top of this model has three flat sides leading down to the three flat sides of the main body 12. This tip is very similar to a trocar broad head tip and a viewing of FIG. 14 shows the general broad head appearance of this model when viewed with the hooks 1 in the open or extended position and the tip 9 facing you. This design is not only functional but, I believe, also marketable due to the general awesomeness factor of this appearance catering directly to bow hunters everywhere.

The above described and prior viewed drawings serve as a description of the present invention in its preferred embodiments. It is understood that the words that have been used are words of description rather than limitation and that changes may be made within reason, without departing from the true scope and spirit of the invention in its broader aspects.

I claim:

1. A multifunctional retrieval tool comprising:
 a. an elongated body, comprising:
  i. a longitudinal axis, a tapered tip at a top end and a flat surface at a bottom end opposite the top end,
  ii. three or four flat planar facets disposed between the top and bottom ends, wherein each of the flat planar facets are elongated and disposed with its long axis parallel to, at equal radial distances from the longitudinal axis and at equal angular spacing between adjacent facets around the longitudinal axis,
  iii. a concave chamfer between each pair of adjacent facets,
  iv. a magnet disposed in the surface of each facet,
 b. a plurality of hooks equal to the number of facets, each hook comprising a length of wire with a single angle equal to or less than 90 degrees, the angle dividing each hook into an upper and lower end, wherein the upper end of each hook registers and articulates in a hole in the bottom end,
 c. a cylindrical chamber disposed coaxially within the elongated body, the chamber having an opening at the bottom end.

2. The multifunctional retrieval tool of claim 1, further comprising a plug engaging the opening at the bottom end.

3. The multifunctional retrieval tool of claim 2, further comprising a magnet disposed in the plug.

4. The multifunctional retrieval tool of claim 1, further comprising a nub disposed on the surface of one or more concave chamfers.

5. The multifunctional retrieval tool of claim 1, further comprising means for attaching a rope to the tapered tip.

6. The multifunctional retrieval tool of claim 1, further comprising sharpened hooks.

* * * * *